US009628491B1

(12) United States Patent
Jerrard-Dunne

(10) Patent No.: US 9,628,491 B1
(45) Date of Patent: *Apr. 18, 2017

(54) SECURE ASSERTION ATTRIBUTE FOR A FEDERATED LOG IN

(71) Applicant: International Business Machines Corporation, Armonk, NY (US)

(72) Inventor: Stanley K. Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,319

(22) Filed: Aug. 22, 2016

Related U.S. Application Data

(63) Continuation of application No. 15/063,276, filed on Mar. 7, 2016, now Pat. No. 9,485,256, which is a continuation of application No. 15/005,231, filed on Jan. 25, 2016.

(51) Int. Cl.
*H04L 29/06* (2006.01)
*G06F 17/30* (2006.01)
*H04W 12/06* (2009.01)

(52) U.S. Cl.
CPC ...... *H04L 63/101* (2013.01); *G06F 17/30867* (2013.01); *H04L 63/08* (2013.01); *H04L 63/083* (2013.01); *H04L 63/10* (2013.01); *H04W 12/06* (2013.01)

(58) Field of Classification Search
None
See application file for complete search history.

(56) References Cited

U.S. PATENT DOCUMENTS

| 6,742,114 | B1 | 5/2004 | Carter et al. |
| 8,095,969 | B2 | 1/2012 | Dillaway et al. |
| 8,533,803 | B2 | 9/2013 | Cha et al. |
| 8,655,757 | B1 | 2/2014 | Wookey et al. |
| 8,838,986 | B2 | 9/2014 | Cahill |
| 9,009,799 | B2 | 4/2015 | Mason |

(Continued)

FOREIGN PATENT DOCUMENTS

WO  2014005148 A1  1/2014

OTHER PUBLICATIONS

Novell, "Subject NameID value sent with assertion not changed despite change on back end user store mapping to this attribute," Knowledgebase, https://www.novell.com/support/kb/doc.php?id=7016281, Printed on Oct. 28, 2015, pp. 1-2.

(Continued)

*Primary Examiner* — Benjamin Lanier
(74) *Attorney, Agent, or Firm* — Samuel A. Waldbaum

(57) ABSTRACT

Embodiments of the present invention disclose a method, computer program product, and system for authenticating a user. The application server receives a user log in request and determines if a unique identification accompanies the received user log in request. The application server uses the unique identification to authenticate the identity of the user. The application server determines if the unique identification has been previously received by searching a first database to see if the unique identification was already stored in the first database. If the unique identification is not in the first database then the application server stores the unique identification and grants the user access to the one or more applications hosted on the application server.

1 Claim, 6 Drawing Sheets

(56) References Cited

U.S. PATENT DOCUMENTS

| | | |
|---|---|---|
| 9,485,256 B1 | 11/2016 | Jerrard-Dunne |
| 2010/0216430 A1 | 8/2010 | Brown et al. |
| 2010/0319068 A1 | 12/2010 | Abbadessa et al. |
| 2012/0317624 A1 | 12/2012 | Monjas Llorente et al. |
| 2015/0040190 A1 | 2/2015 | Oberheide et al. |
| 2015/0058960 A1 | 2/2015 | Schmoyer et al. |
| 2015/0222621 A1 | 8/2015 | Baum et al. |
| 2015/0350170 A1 | 12/2015 | Roselle et al. |

OTHER PUBLICATIONS

Wikipedia, "Security Assertion Markup Language," Wikipedia, the free encyclopedia, https://en.wikipedia.org/wiki/Security_Assertion_Markup_Language, Printed on Dec. 17, 2015, pp. 1-8.

Wikipedia, "Universally unique identifier," Wikipedia, the free encyclopedia, https://en.wikipedia.org/wiki/Universally_unique_identifier, Printed on Dec. 17, 2015, pp. 1-4.

Mell et al., "The NIST Definition of Cloud Computing," National Institute of Standards and Technology, U.S. Department of Commerce, Special Publication 800-145, Sep. 2011, pp. 1-7.

Pending U.S. Appl. No. 15/005,231, filed Jan. 25, 2016, Entitled: "Secure Assertion Attribute for a Federated Log In", pp. 1-35.

IBM, List of IBM Patents or Patent Applications Treated as Related, Appendix P, dated Nov. 11, 2016, 2 pages.

SECURE ASSERTION ATTRIBUTE FOR A FEDERATED LOG IN

BACKGROUND

The present invention relates generally to user authentication, and more particularly to limiting access to authorized users.

Many organizations use a security assertion mark-up language (SAML) federated log in to authenticate a user when the user logs in to the organization system. A common identifier used by an organization for authentication is a user email address associated with each user. The user may be able to log in to another application or a third party server through an access portal on the organization system. The organization systems transmit the user email address to the other application or the third party server as a means to authenticate the identity of the user. However, within most organizations a system administrator and/or a department administrator is able to access and edit a database within the organization that contains the user email address that is sent for user authentication. In this situation, it is possible that a user may be impersonated when a person who has access to the database is able to make changes to the user email address associated with each user.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for authenticating a user. The first computer receives a request for a user log in from a user computing device and authenticates an identity of the user and granting the user access to applications hosted on the first computer, wherein one of the those applications is an access portal to a second computer. The first computer searches a storage unit for a unique identification that is associated with the user, and the first computer determines that the unique identification has not been found in the storage unit. In response to not finding the unique identification in the storage unit, the first computer generates the unique identification to be associated with a user, based on a unique arbitrary value to generate a universally unique identifier. The first computer stores the generated unique identification in the storage unit. A second computer receives a request for a user log in from the access portal hosted on the first computer and determines if the unique identification accompanies the received user log in request, wherein the unique identification is used to authenticate the identity of the user. The second computer determines if the unique identification has been previously received by searching a database to see if the unique identification was already stored in the database. In response to the unique identification not being previously received, the second computer stores the unique identification to the database and grants access to the user to an application hosted on the second computer.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
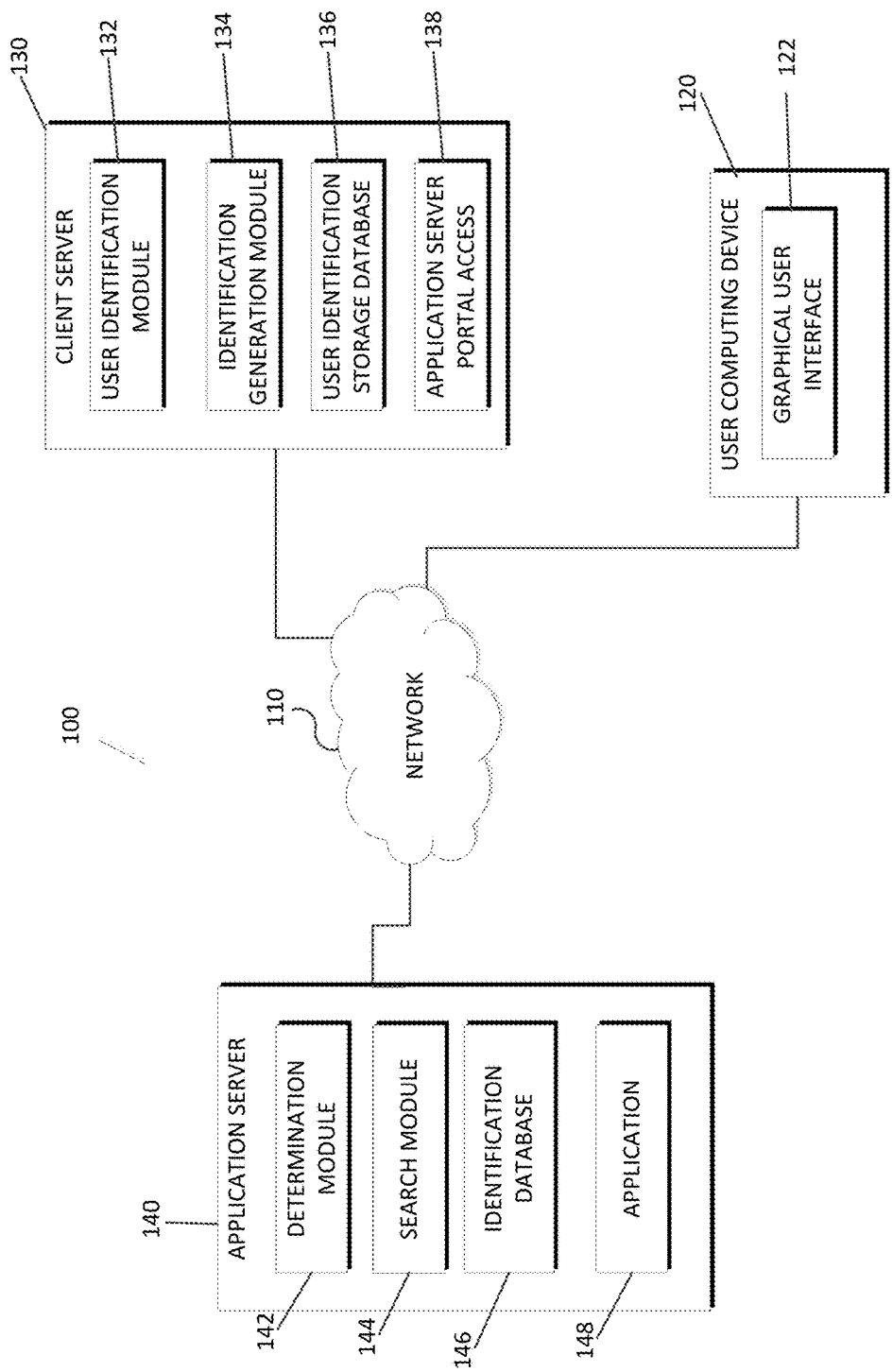
FIG. 1 is a functional block diagram illustrating a user authentication system, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for user authentication using a secure attribute for a federated log in. A company or organization hosts a client server or a system that an employee or a user is able to log in to and allows the user to access the information and/or application stored on the client server. The client server assigns a unique identifier to each user and stores that unique identifier in a secure database. The client server contains an access portal for an application server or a third party server and the client server transmits the unique identifier to the application server or the third party server to authenticate the user. The application server determines if the user has a unique identifier associated with the log in and determines if the unique identifier is stored within an identification database. If it is determined that the user's unique identifier is already stored in the database, then the user is granted access to the application and/or the identifier is added to the database if not previously stored before the user is granted access to the application.

FIG. 1 is a functional block diagram illustrating a user authentication system 100, in accordance with an embodiment of the present invention. The user authentication system 100 includes a user computing device 120, a client server 130, and an application server 140 that communicate with each other via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the user computing device 120, the client server 130 and the application server 140, in accordance with an embodiment of the invention.

The user computing device 120 represents a computing device that includes a user interface, for example, a graphical user interface (GUI) 122 that allows the user to access, for example, the application server portal access 138. GUI 122 represents one or more user interfaces for sending and receiving information from the client server 130 and the application server 140. GUI 122 may be, for example, a web browser, an application, or other types of GUIs for communication between the user computing device 120, application server 140 and the client server 130, via the network 110, in accordance with an embodiment of the invention.

Figure 5:
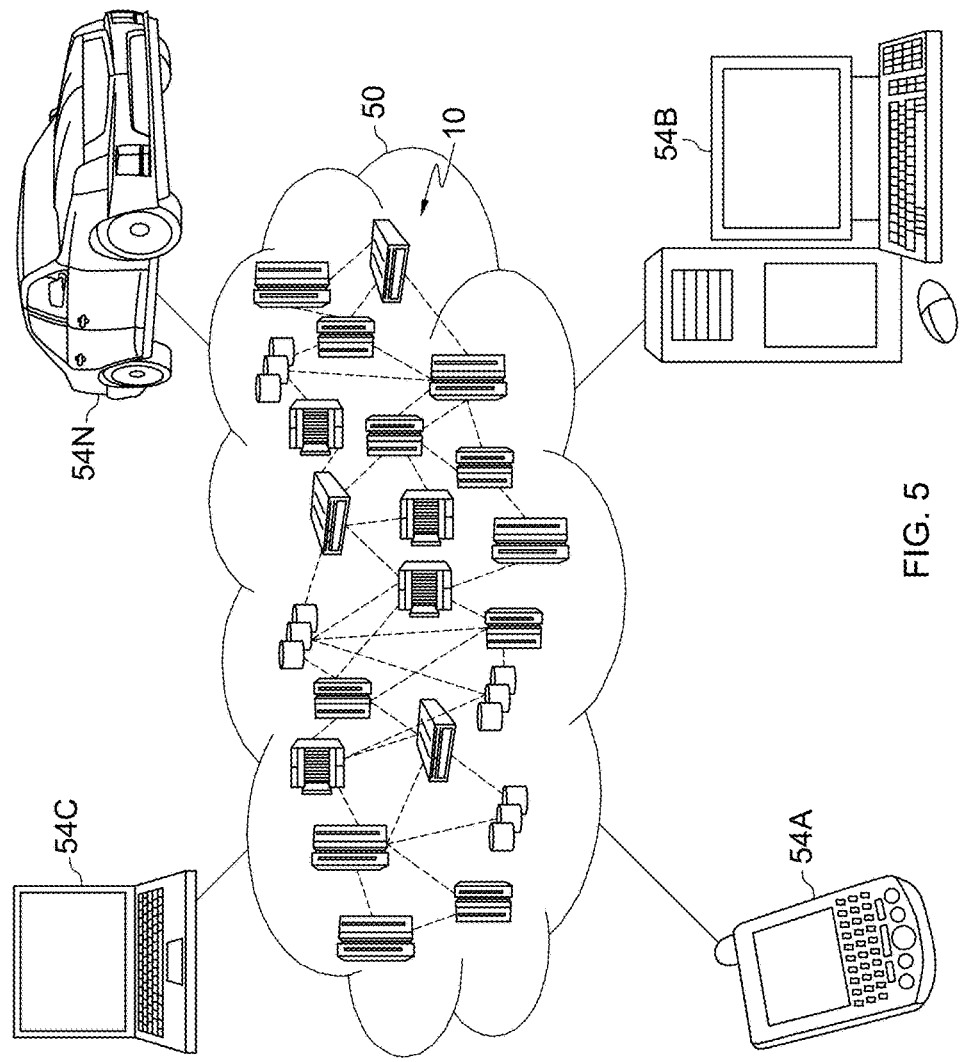
FIG. 5 depicts a cloud computing environment according to an embodiment of the present invention.
Figure 6:
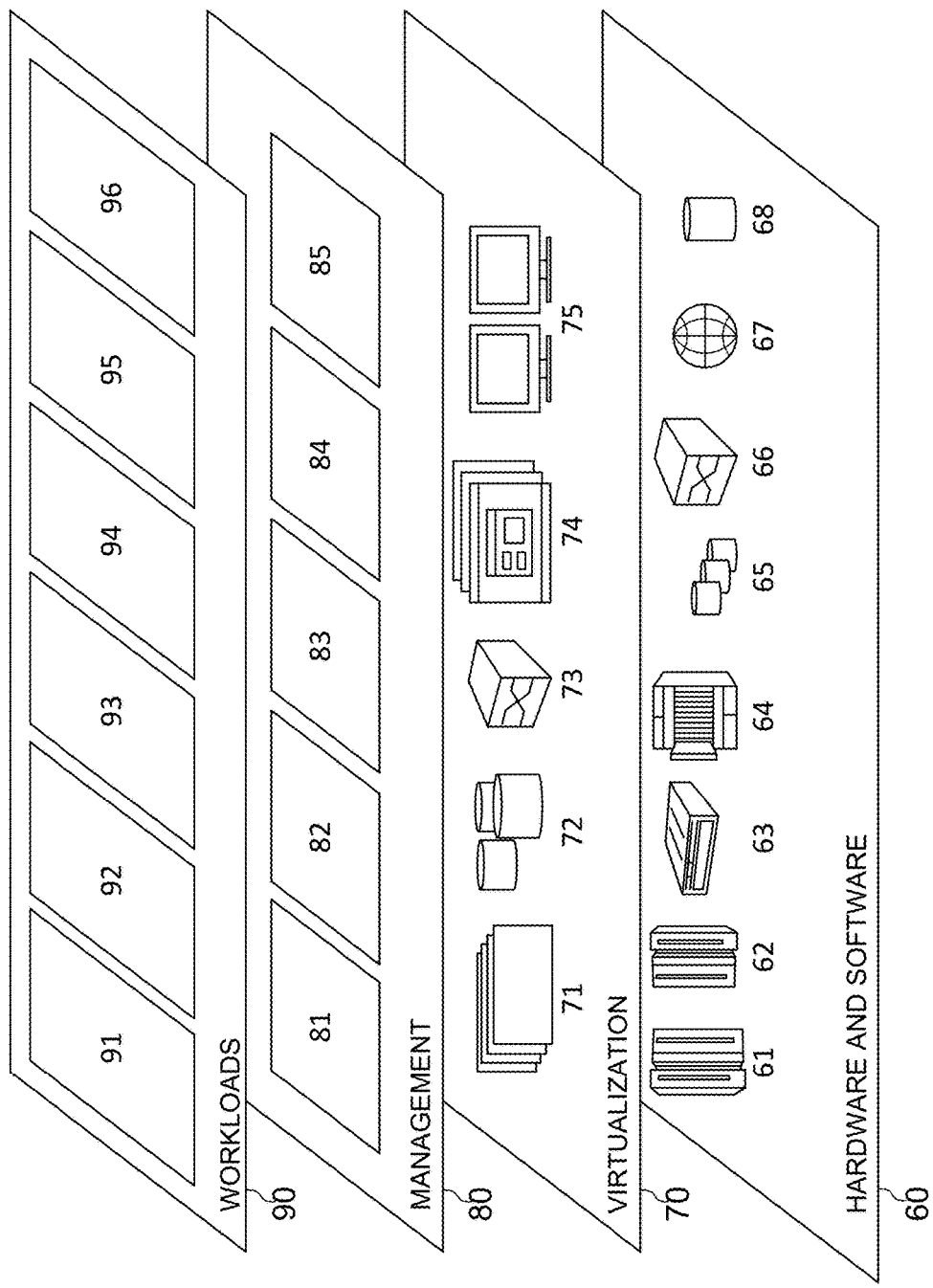
FIG. 6 depicts abstraction model layers according to an embodiment of the present invention.

The user computing device 120 may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as depicted and described in further detail below with respect to FIG. 4. In other embodiments, the user computing device 120 may operate in a cloud computing environment, as depicted in FIGS. 5 and 6.

The client server 130 allows for the user computing device 120 to log in to the organization or business system hosted on the client server 130. When logged into the client server 130 the user computing device 120 is able to access applications or other programs hosted on the client server 130, such as, application server portal access 138. The client server 130 includes a user identification module 132, an identification generation module 134, a user identification storage database 136, and an application server portal access 138. The client server 130 may include internal and external hardware components, as depicted and described in further detail below with respect to FIG. 4. In other embodiments, the client server 130 may operate in a cloud computing environment, as depicted in FIGS. 5 and 6.

The user identification module 132 receives a user log in request from the user computing device 120 when the user is trying to log on to the client server 130 and determines if the user is authorized to access the client server 130. In an exemplary embodiment, the user identification module 132 uses a security assertion mark-up language (SAML) federated log in to authenticate the user.

A SAML implementation typically defines three roles: the principal, for example, the user computing device, the identity provider (for example, the user identification module 132), and the service provider (for example, the client server 130). In the use case addressed by SAML, the principal requests a service from the service provider. The service provider requests and obtains an identity assertion from the identity provider. On the basis of this assertion, the service provider can make an access control decision, in other words it can decide whether to perform some service for the connected principal. Before delivering the identity assertion to the service provide, the identity provider may request some information from the principal, such as a user name and password, in order to authenticate the principal.

The user identification module 132 further determines if a unique identification has been previously generated for the user. The user identification module 132 determines if a unique identification has been created by searching the user identification storage database 136 to see if a corresponding unique identification to the user has been stored. If a unique identification has not been generated then the user identification module 132 sends a request to the identification generation module 134 to generate a unique identification.

The identification generation module 134 generates a unique identification for each user that logs onto the client server 130. The unique identification is only generated one time for each user since the unique identification does not change once they have been generated. The unique identification is an immutable attribute that is assigned and stored in user identification storage database 136. The unique identification can be, for example, a universally unique identifier (UUID), which is an identifier used in software construction. A UUID can be, but is not limited to, a 128-bit value generated from applying the UUID generator to an arbitrary base value, for example, a time value when the UUID is being generated, the user email address, or any unique arbitrary value that can be used to generated the UUIDs. The intent of UUIDs is to enable distributed systems to uniquely identify information without significant central coordination.

The user identification storage database 136 is a data store that stores the unique identification for each of the users. The user identification storage database 136 is a secure database with limited access to prevent the changing or editing of the stored unique identification associated with each user.

The application server portal access 138 allows for a user to gain access to the application server 140. The application server portal access 138 retrieves the unique identification associated with the user from the user identification storage database 136 and transmits the unique identification to the application server 140.

The application server 140 represents one or more platforms that host an application or another service that a user can access through the application server portal access 138. The application server includes a determination module 142, a search module 144, an identification database 146, and an application 148. The application server 140 may include internal and external hardware components, as depicted and described in further detail below with respect to FIG. 4. In other embodiments, the application server 140 may operate in a cloud computing environment, as depicted in FIGS. 5 and 6.

The determination module 142 determines when a user is trying to access the application server 140 through the application server portal access 138 using a security assertion mark-up language (SAML) assertion. The determination module 142 determines if a unique identification accompanies the request for access to the application server 140. The SAML assertion is the signed data unique identification (i.e. the unique identification associated with each user) is sent from the client server 130 to the application server 140 for the purpose of affecting a log in. The unique identification is signed by the client server 130 and used to assert that the user is who they claim to be. The determination module 142 determines if the unique identification that accompanies the user log in request grants the user access to the application 148.

The determination module 142 requests that the search module 144 search the identification database 146 to determine if the unique identification is known, i.e. the unique identification has been previously received and stored by application server 140. When the unique identification is known, then the determination module 142 grants the user access to the application 148 or other services hosted on application server 140. When the unique identification is unknown, then the determination module 142 stores the unique identification in the identification database 146 prior to or after granting the user access to the application 148.

When the determination module 142 determines that a unique identification does not accompany the user request for access to the application server 140, then the determination module 142 authenticates the user by using the user's email address and grants the user limited access to the application 148. The determination module 142 then transmits a request to the client server 130 that a unique identification for the user to be generated.

The search module 144 represents a search application that is able search the identification database 146 for the unique identification that accompanies the user log in request. The search module 144 transmits to the determination module 142 if the unique identification is known or not.

The identification database 146 is a secure data store that stores the unique identification that application receives from the different users log in requests. The identification database 146 stores the unique identifications for each user and the identification database 146 is secure database, such that, it prevents user access to the stored unique identifications.

The application 148 is an application, program, software or service that is provided to an authorized user. Once the user is granted access by the determination module 142 then the user is able to access the application 148. If the determination module 142 grants the user limited access then the user is only able to access previously predetermined functions of the application 148.

Figure 2:
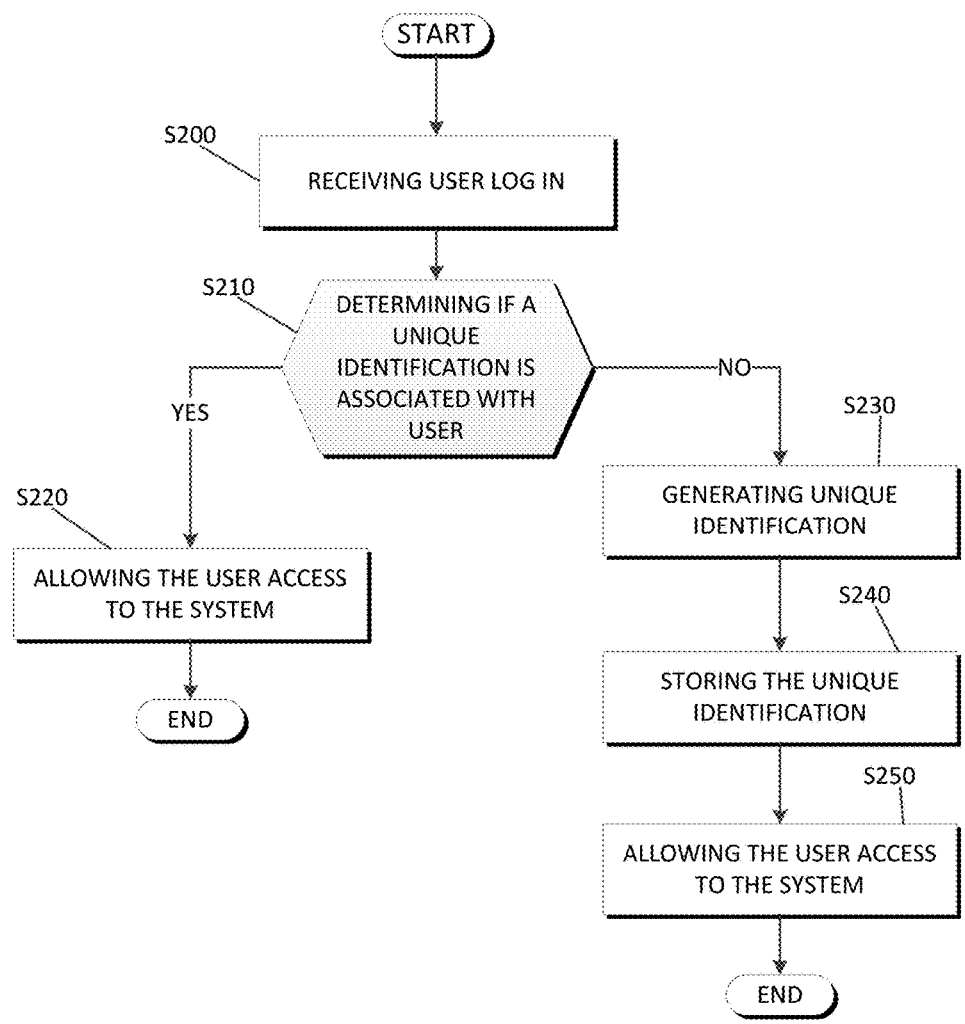
FIG. 2 is a flowchart depicting operational steps of a client server authenticating a user and creating a unique user identification associated with the user for the user authentication system of FIG. 1, in accordance with an embodiment of the present invention.

FIG. 2 is a flowchart depicting operational steps of a client server authenticating a user and creating a unique user identification associated with the user for the user authentication system of FIG. 1, in accordance with an embodiment of the present invention.

The user identification module 132 receives the user log in (S200) and the user identification module 132 determines if a unique identification is already associated with the user (S210). When the user identification module 132 determines that the user already has a unique identification associated with him, then the user identification module 132 grants access to user to the client server 130 (S220). When the user identification module 132 determines that a user does not have a unique identification, then the identification generation module 134 generates a unique identification to be associated with the user (S230) and the user identification storage database 136 stores the unique identification (S240). The user identification module 132 grants the user access to the client server 130 (S250).

Figure 3:
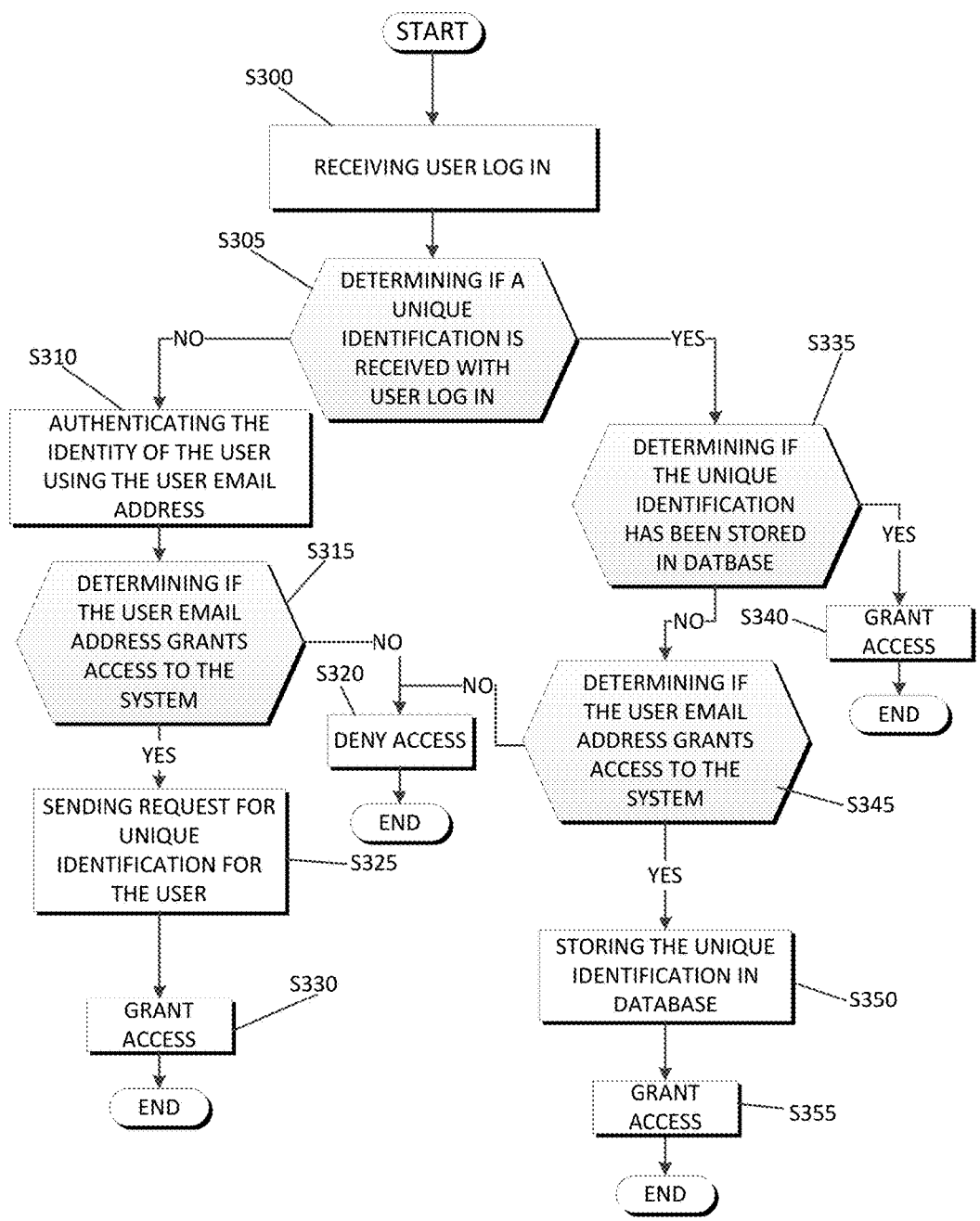
FIG. 3 is a flowchart depicting operational steps of the application server for authenticating the user of the user authentication system of FIG. 1, in accordance with an embodiment of the present invention.

FIG. 3 is a flowchart depicting operational steps of the application server for authenticating the user of the user authentication system of FIG. 1, in accordance with an embodiment of the present invention.

The application server 140 receives the user's log in request through the application server portal access 138 on the client server (S300). The determination module 142 determines if a unique identification was received with the user log in request (S305). When no unique identification was received then the user email address is used for authentication (S310) and the determination module 142 determines if the user should be granted to access to the application server 140 (S315). When the user is not authorized for access then the determination module 142 denies access to the user (S320). When the user is authorized to access the application server 140, then the determination module 142 sends a request to the client server 130 for a unique identification to generated for the user (S325) and the determination module 142 grants the user access to the application 148 (S330).

When a unique identification accompanies the user long in request, the search module 144 searches the identification database 146 to determine if the unique identification has been stored in the database (S335). When the unique identification has been previously stored then the user is granted access to the application 148 (S340). When the search module 144 was not able to find the unique identification in the database, then the user email address is used for authentication and the determination module 142 determines if the user should be granted to access to the application server 140 (S345). If the user is authorized for access then the determination module 142 stores the unique identification in the identification database (S350) and the user is granted access to the application 148 (S355). When the user is not authorized for access then the determination module 142 denies access to the user (S320).

Figure 4:
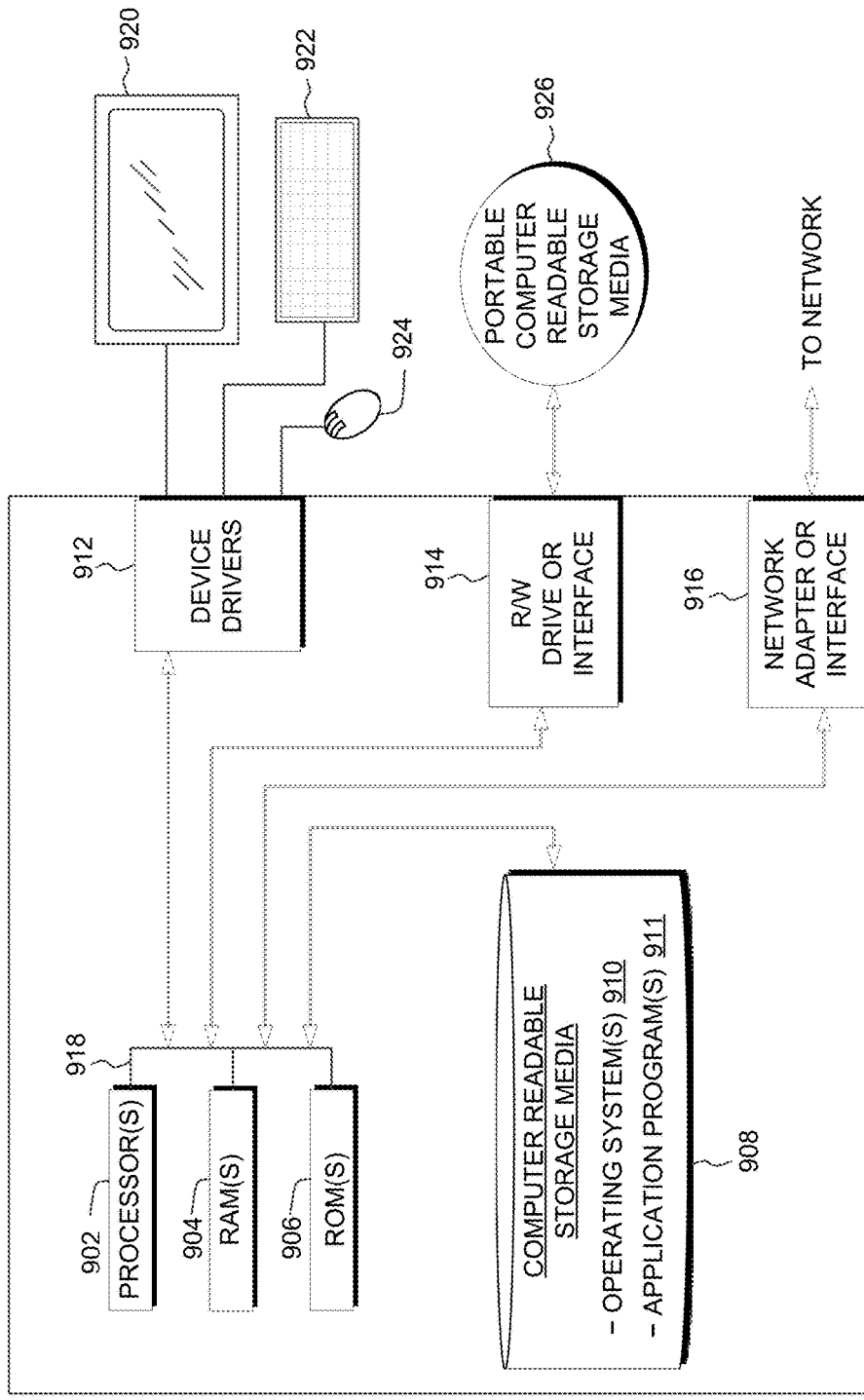
FIG. 4 is a block diagram of components of a computing device of the user authentication system of FIG. 1, in accordance with embodiments of the present invention.

FIG. 4 depicts a block diagram of components of user computing device 120, client server 130, and application serve 140 of the user authentication system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

User computing device 120, client server 130 and/or application server 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, user authentication program comprised of the determination module 142, the search module 144 and the identification database 146 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 120, client server 130 and/or application server 140 may also include a R/W drive or interface 914 to read from and write to one or more portable computer readable storage media 926. Application programs 911 on user computing device 120, client server 130 and/or application server 140 may be stored on one or more of the portable computer readable storage media 926, read via the respective R/W drive or interface 914 and loaded into the respective computer readable storage media 908.

User computing device 120, client server 130 and/or application server 140 may also include a network adapter or interface 916, such as a TCP/IP adapter card or wireless communication adapter (such as a 4G wireless communication adapter using OFDMA technology). Application programs 911 on user computing device 120, client server 130 and/or application server 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 120, client server 130 and/or application server 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a user authentication system 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer program product for authenticating a user, the computer program product comprising:
   one or more non-transitory computer-readable storage media and program instructions stored on the one or more non-transitory computer-readable storage media, the program instructions comprising:
      receiving a request for a user log in from a access portal hosted on a first computer;
      determining if an unique identification accompanies the received user log in request, wherein the unique identification is associated with a user, based on a unique arbitrary value to generate a universally unique identifier, wherein the unique identification is used to authenticate the identity of the user;
      determining if the unique identification has been previously received by searching a database to see if the unique identification was already stored in the database;
      in response to the unique identification not being previously received, determining whether an unique arbitrary value grants access to an application, and storing the unique identification to the database; and
      granting access to the user to the application based on the determination.

* * * * *